United States Patent
Yeh et al.

(10) Patent No.: US 9,503,171 B2
(45) Date of Patent: Nov. 22, 2016

(54) METHOD FOR TRANSMITTING SIGNAL USING MULTIPLE ANTENNAS

(71) Applicant: Electronics and Telecommunications Research Institute, Daejeon (KR)

(72) Inventors: Choong Il Yeh, Daejeon (KR); Jae Young Ahn, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 93 days.

(21) Appl. No.: 14/146,942

(22) Filed: Jan. 3, 2014

(65) Prior Publication Data

US 2014/0192768 A1 Jul. 10, 2014

(30) Foreign Application Priority Data

| Jan. 4, 2013 | (KR) | 10-2013-0001320 |
| Jan. 7, 2013 | (KR) | 10-2013-0001480 |
| Jan. 2, 2014 | (KR) | 10-2014-0000080 |

(51) Int. Cl.
*H04B 7/06* (2006.01)
*H04B 7/04* (2006.01)
*H04B 7/02* (2006.01)

(52) U.S. Cl.
CPC ............. *H04B 7/06* (2013.01); *H04B 7/0469* (2013.01); *H04B 7/0478* (2013.01); *H04B 7/024* (2013.01); *H04B 7/0486* (2013.01); *H04B 7/065* (2013.01); *H04B 7/0639* (2013.01)

(58) Field of Classification Search
CPC ............... H04B 7/0417; H04B 7/0639; H04B 7/0469; H04B 7/0691; H04B 7/0408; H04B 7/0456; H04B 7/0619; H04B 7/0478; H04B 7/0617; H04B 7/06; H04B 7/0421; H04B 7/0697; H04L 27/2613; H04W 72/042
See application file for complete search history.

(56) References Cited

U.S. PATENT DOCUMENTS

| 5,689,526 A * | 11/1997 | Slonneger et al. ........... 375/145 |
| 2006/0245509 A1* | 11/2006 | Khan et al. .................. 375/260 |
| 2009/0322613 A1* | 12/2009 | Bala et al. .................... 342/373 |
| 2010/0075706 A1* | 3/2010 | Montojo et al. .............. 455/513 |
| 2010/0215112 A1 | 8/2010 | Tsai et al. |
| 2011/0142147 A1* | 6/2011 | Chen et al. ................... 375/260 |
| 2011/0205930 A1* | 8/2011 | Rahman et al. .............. 370/252 |
| 2012/0099674 A1 | 4/2012 | Moulsley et al. |
| 2013/0329772 A1* | 12/2013 | Wernersson et al. ......... 375/219 |
| 2015/0229375 A1* | 8/2015 | Vook et al. ................... 370/329 |

* cited by examiner

*Primary Examiner* — Anh Ngoc Nguyen
*Assistant Examiner* — Ricardo Castaneyra
(74) *Attorney, Agent, or Firm* — Nelson Mullins Riley & Scarborough LLP

(57) ABSTRACT

Disclosed is a method for transmitting radio frequency signals. In the method according to the present invention, a plurality of antenna groups may be arranged for achieving array gain and multiplexing gain at the same time, and the plurality of antenna groups are located far from each other so that they have no correlation, and antennas of the same group are located adjacent to each other so that they have correlation. Accordingly, system capacity as well as capacity of data channel and control channel may be significantly increased through mitigation of inter-cell interference and enhancement of cell edge performance.

15 Claims, 8 Drawing Sheets

METHOD FOR TRANSMITTING SIGNAL USING MULTIPLE ANTENNAS

CLAIM FOR PRIORITY

This application claims priority to Korean Patent Applications No. 10-2013-0001320 filed on Jan. 4, 2013 and No. 10-2013-0001480 filed on Jan. 7, 2013 and No. 10-2014-0000080 filed on Jan. 2, 2014 in the Korean Intellectual Property Office (KIPO), the entire contents of which are hereby incorporated by reference.

BACKGROUND

1. Technical Field

Example embodiments of the present invention relate in general to a technology for wireless telecommunications, and more specifically, to a method for transmitting signals using multiple antennas, which can increase capacity of wireless communication system.

2. Related Art

A technology of using multiple antennas such as Multiple Input and Multiple Output (MIMO) is being used for increasing capacity of wireless communication system. The technology of multiple antennas may be classified into a technology of beamforming to achieve array gain using correlation between antennas and a technology of spatial multiplexing (SM) to achieve multiplexing gain using uncorrelation between antennas.

The technology of beamforming may provide targeted receivers with high signal-to-noise ratio (SNR) by forming electromagnetic wave having directivity toward a specific direction, and make other receivers except the targeted receivers not to receive interference.

Thus, a base station of a cellular communication system may use the technology of beamforming so as to provide high quality communication services to terminals located at edge of cell belonging to the base station, and may use a technology of Space Division Multiple Access (SDMA) based on the technology of beamforming so as to provide services to a plurality of terminals through the same frequency spectrum.

On the other hand, a multiplexing gain may be achieved when correlation between multiple antennas is low. According to an information theory, an enhancement of system capacity due to multiplexing gain is usually larger than an enhancement of system capacity which can be achieved by using beamforming.

However, high SNR is required to use the technology of spatial multiplexing. Also, although high number of MIMO channel rank is demanded in order to achieve effect from use of the technology of spatial multiplexing, practically it may not be realized. Generally, high SNR region in a cell is a center region adjacent to the base station of the cell which cannot achieve enough high number of channel rank. Also, regions far from the base station which are beyond line-of-sight (LOS) area may have enough high number of channel rank, but SNR may be low in the regions. Therefore, an environment to which the technology of spatial multiplexing can be applied is restricted.

According to an information theory, an enhancement of system capacity due to multiplexing gain is superior to an enhancement of system capacity due to array gain. However, environments suitable for pursuing multiplexing gain and those for array gain may be separated. Thus, a commercialized wireless communication system pursuing multiplexing gain and a commercialized wireless communication system pursuing array gain may exist separately.

SUMMARY

Accordingly, example embodiments of the present invention are provided to substantially obviate one or more problems due to limitations and disadvantages of the related art.

An example embodiment of the present invention provides a method for transmitting signals using multiple antennas which can increase capacity of wireless communication system.

In an example embodiment, there is provided a method for transmitting radio frequency signals, wherein a plurality of antenna groups are arranged for achieving array gain and multiplexing gain at the same time, and the plurality of antenna groups are located far from each other so that they have no correlation, and antennas of the same group are located adjacent to each other so that they have correlation.

In another example embodiment, there is provided a method for transmitting signals, performed in a base station, comprising: transmitting reference signal for each antenna group and reference signal for each directional beam to a terminal; receiving a first precoder matrix index (PMI-1) and a second precoder matrix index (PMI-2), which are calculated based on the reference signals, from the terminal; and performing precoding on downlink data and reference signal for demodulation (DMRS) based a first precoder ($P_1$) corresponding to the first precoder matrix index and a second precoder ($P_2$) matrix corresponding to the second precoder matrix index.

Here, the first precoder may be a precoding matrix for each of a plurality antenna groups to form directional beam, and the second precoder may be a precoding matrix for achieving multiplexing gain using the directional beam.

Here, the reference signals may be generated by using Pseudo-Noise (PN) sequence and Orthogonal Cover Code (OCC) sequence. Also, the reference signals may be generated by multiplying the PN sequence and one of OCC sequences a number of which is the same as a number of antenna groups. Also, the PN sequence may be initialized in each time period configured with a predetermined interval. Also, the PN sequence may be initialized using at least one of a cell identifier, a beam identifier, and an index of time period.

Here, the precoding on the reference signal may be performed using only the first precoder $P_1$ not the second precoder $P_2$.

Here, the reference signals may be transmitted using the same time-frequency resources when beams formed by the antenna groups are toward the same direction, and each reference signal is distinguished using PN sequence and OCC sequence, and the adjacent directional beams are applied to the reference signals.

Here, the performing precoding on reference signal for demodulation may comprise generating the reference signal for demodulation by multiplying Orthogonal Cover Code (OCC) sequence and Pseudo-Noise (PN) sequence which is initialized using at least one of an identifier of the terminal, a cell identifier, a beam identifier, and an index of time period; performing precoding on the generated reference signal for demodulation by using the first precoder $P_1$ and the second precoder $P_2$ which are applied to the precoding on the downlink data; and transmitting downlink signal comprising the precoded downlink data and the precoded reference signal for demodulation to the terminal.

In still another example embodiment, there is provided a method for transmitting signals, performed in a base station, comprising: transmitting reference signals through directional beams formed by each of a plurality of antenna groups; receiving information on rank, a first precoder matrix index, and a second precoder matrix index of MIMO channels between the base station and a plurality of terminals which are determined based on the reference signals from the plurality of terminals; and determining MIMO transmission method for at least one of the plurality of terminals based on the information on rank, a first precoder matrix index, and a second precoder matrix index.

When the first precoder matrix indexes reported from at least two terminal are different or when the first precoder matrix indexes reported from at least two terminal are the same and the second precoder matrix indexes reported from at least two terminal are different, Multi User MIMO (MU-MIMO) may be performed, or Single User MIMO (SU-MIMO) and MU-MIMO may be performed simultaneously in order to transmit downlink data.

In still another example embodiment, there is provided a method for transmitting cooperative signals, performed in a first base station and a second base station, comprising: determining, by a terminal, first precoder matrix indexes and second precoder matrix indexes for the first base station and the second base station based on reference signals transmitted for the first base station and the second base station, and reporting, by the terminal, the first precoder matrix indexes and the second precoder matrix indexes to the first base station or to the first and the second base stations; reporting, by the first base station, the first precoder matrix indexes and the second precoder matrix indexes to the second base station via an interface between the first and the second base stations; and performing, by the first and the second base stations, Single User MIMO (SU-MIMO) and Multi User MIMO (MU-MIMO) based on the first precoder matrix indexes and the second precoder matrix indexes.

In still another example embodiment, there is provided a method for transmitting control channel performed in a base station, wherein the base station transmits the same control data which omni-directional precoding is applied to by using a plurality of antenna groups, and wherein the base station transmits antenna group specific reference signals for control channel demodulation multiplexed by using at least one of time division multiplexing (TDM), code division multiplexing (CDM), and frequency division multiplexing (FDM) in order to enable transmit diversity of control channel, so that a terminal discriminates each reference signal for each of the plurality of antenna groups.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

Embodiments of the present invention which will be describe below may be supported by at least one of various standard specifications such as an Institute of Electrical and Electronics Engineers (IEEE) 802 system, a 3rd Generation Partnership Project (3GPP) system, a 3GPP LTE system, and a 3GPP2 system. That is, steps and procedures explanation of which are omitted in this specification for clarifying the technical thought of the present invention may be supported by the above at least one of various standard specifications.

Also, all the terminologies used in this specification may be explained through the above stand specifications.

The term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the terminal is not limited to the above-mentioned units.

The term "base station" used in this specification may mean an apparatus controlling a cell. However, in a practical wireless communication system, a physical base station can control a plurality of cells. In this case, it may be regarded as the physical base station comprises multiple base stations represented in this specification. For example, in this specification, it is understood that parameters specific for each cell are configured by each base station. Also, "base station" used in this disclosure generally refers to a fixed or mobile point that communicates with a terminal and may be a term for collectively referring to a base station, node-B, eNode-B, a BTS (base transceiver system), an access point, a transmit point, a receive point, an RRH (Remote Radio Head), an RRE (Remote Radio Element), an RRU (Remote Radio Unit), a relay, a femto-cell, etc.

A method for transmitting signals using multiple antennas according to an example embodiment of the present invention may provide a method for designing precoders and reference signals which can achieve multiplexing gain and array gain at the same time. Also, A method for transmitting signals using multiple antennas according to an example embodiment of the present invention may be applied to transmission of control channels as well as data channels, and may increase capacity of wireless communication systems remarkably.

Figure 1:
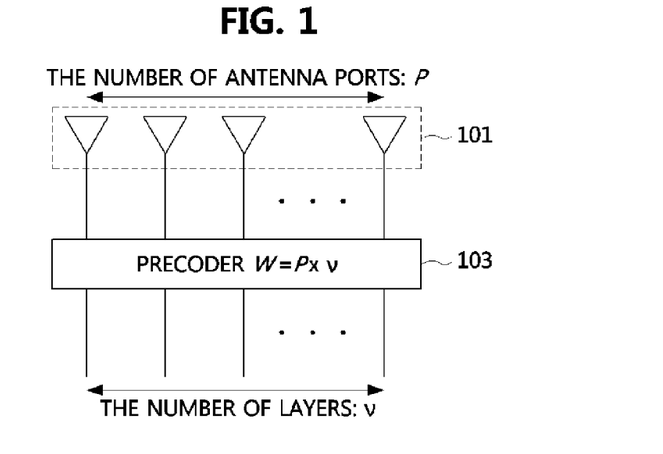
FIG. 1 is a conceptual diagram to explain a method for transmitting signal using an array antenna.

FIG. 1 is a conceptual diagram to explain a method for transmitting signal using an array antenna.

As shown in FIG. 1, an antenna array 101 may comprise antenna groups arranged with constant distances. In FIG. 1, a precoder 103 may be configured as P×v matrix. Here, P may mean the number of antenna ports and v may mean the number of layers.

In a case that distances between individual antennas constituting the array antenna 101 are close enough—for example, the distances are configured to be half-wavelength—so as to make the individual antennas correlated to each other, a beam having directivity toward a desired direction may be formed by assigning appropriate weight value to each of the individual antennas. When a beam is formed using the array antenna 101, the number of layers v may be 1. Also, in this case, although the number of antenna ports constituting the array antenna 101 is P, the antenna array 101 may operate as a single antenna.

Meanwhile, in a case that distances between individual antennas constituting the array antenna 101 are far enough so as to make the individual antennas un-correlated to each other, a beam having directivity toward a desired direction may not be formed. In this case, each antenna of the array antenna 101 may transmit signal through corresponding beam having pattern specific for each antenna, and each of P antenna ports may operate individually.

When antennas constituting the array antenna 101 are correlated to each other, the precoder 103 may be related to formed beam pattern. However, when the array antenna 101 comprises un-correlated antennas, the precoder 103 may not be related to beam pattern radiated toward a specific direction. In the latter case, signals inputted to individual antennas may be radiated using beam patterns specific for each of individual antennas through the precoder 103 which is designed for specific purpose.

Figure 2:
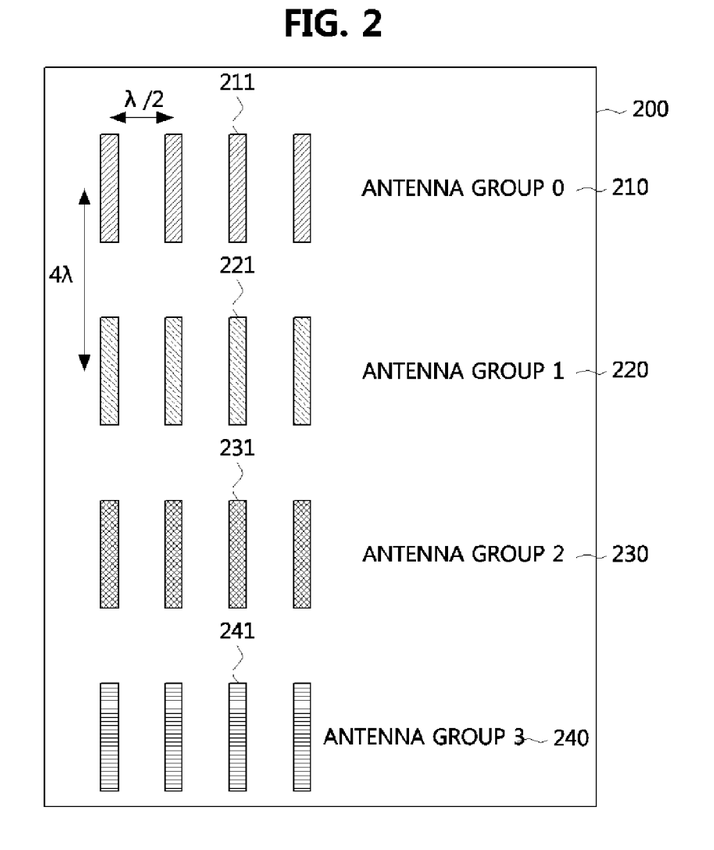
FIG. 2 is a view to illustrate a configuration of multiple antennas according to an example embodiment of the present invention.
Figure 3:
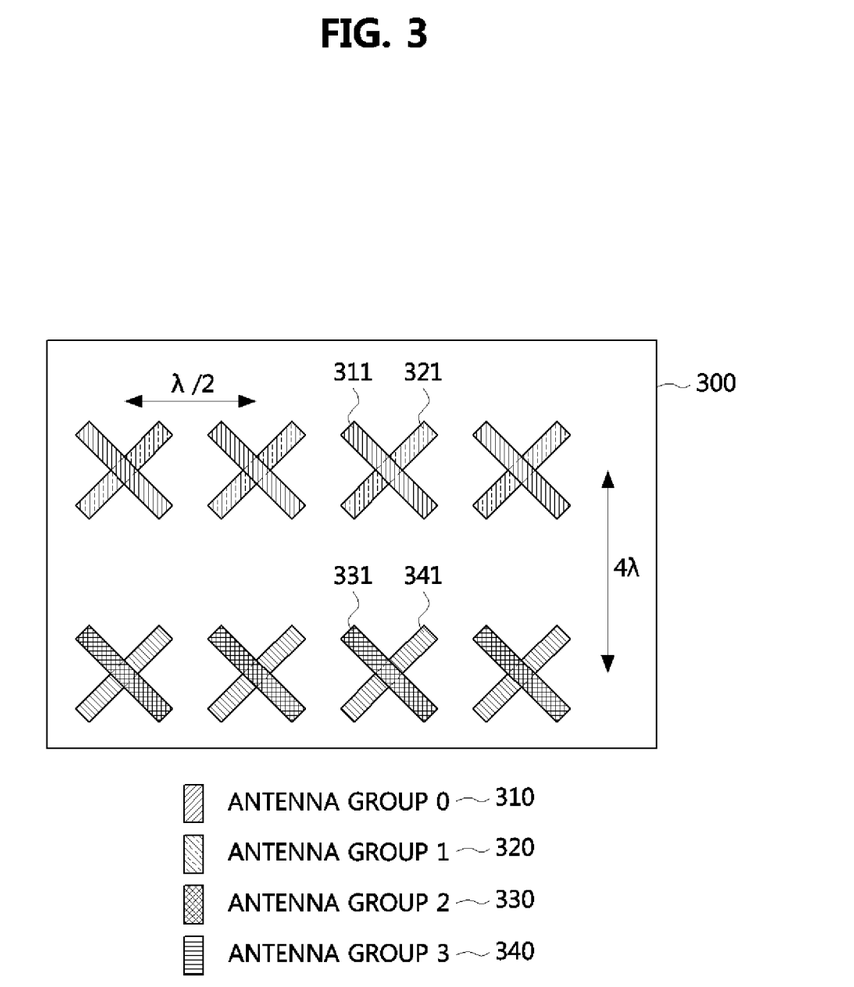
FIG. 3 is a view to illustrate a configuration of multiple antennas according to another example embodiment of the present invention.
Figure 4:
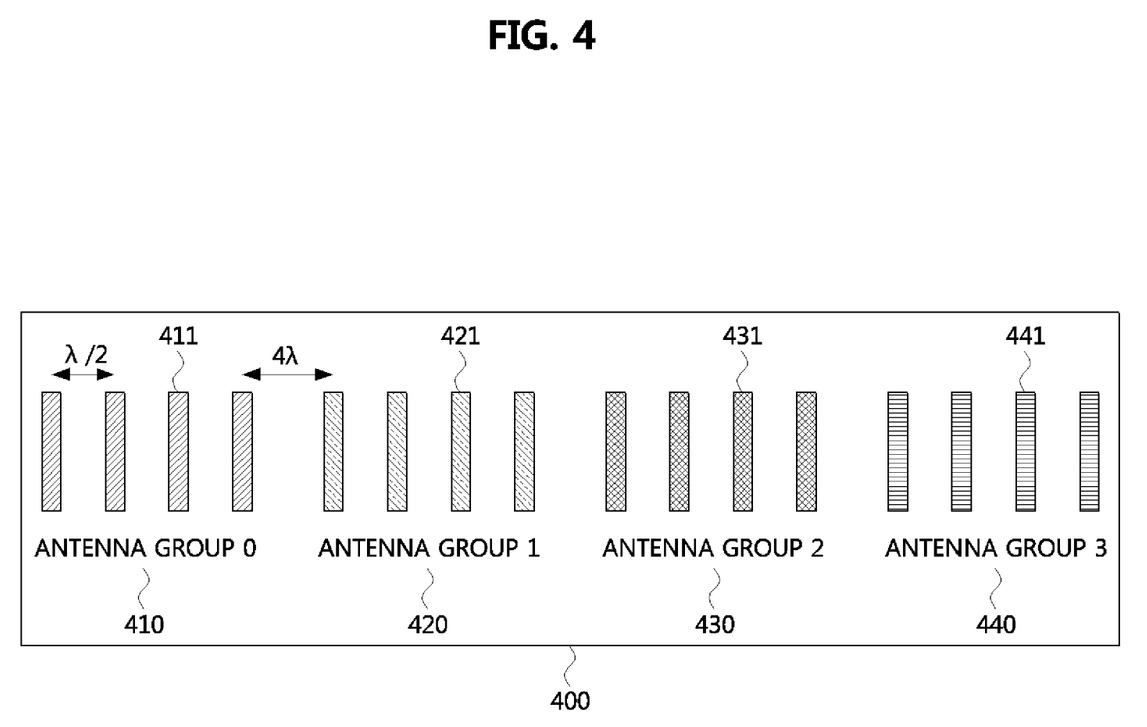
FIG. 4 is a view to illustrate a configuration of multiple antennas according to still another example embodiment of the present invention.

FIG. 2 is a view to illustrate a configuration of multiple antennas according to an example embodiment of the present invention, and FIG. 3 is a view to illustrate a configuration of multiple antennas according to another example embodiment of the present invention, and FIG. 4 is a view to illustrate a configuration of multiple antennas according to still another example embodiment of the present invention.

Hereinafter, configurations and operations of the example embodiments according the present invention will be explained by referring to FIGS. 2 to 4.

Referring to FIGS. 2 to 4, multiple antennas according to the example embodiments of the present invention may comprise 16 antennas totally, and 16 antennas may constitute 4 antenna groups each of which comprises 4 antennas.

First, referring to FIG. 2, the multiple antennas 200 may comprise four antenna groups 210 to 240, and each of the antenna groups may be arranged so as to form a row of the antenna groups.

The distances between the antenna groups may be configured to be far enough so that there is no correlation between the antenna groups. For example, the distances between the antenna groups may be configured to 4λ (λ is a wavelength of carrier frequency).

Also, distances between antennas included in each antenna group may be configured to be close enough so that correlations between the antennas are guaranteed. For example, the distances between the antennas included in each antenna group may be configured to λ/2.

In the configuration of the multiple antennas 200 shown in FIG. 2, each of the antenna groups 210 to 240 may operate as a single antenna. Accordingly, the multiple antennas 200 comprising 16 antennas may operate as four individual antennas.

Referring to FIG. 3, multiple antennas 300 according to another example embodiment of the present invention may comprise four antenna groups 310 to 340. Here, a first antenna group 310 and a second antenna group 320 may be configured to have different polarization. Accordingly, the first antenna group 310 and the second antenna group 320 do not have correlation, and so they do not need to be located so far from each other. For example, as shown in FIG. 3, an antenna 311 of the first antenna group 310 and an antenna 321 of the second antenna group 320 may be arranged intersecting with each other.

Also, a third antenna group 330 and a fourth antenna group 340 may also be configured to have different polarization, and so they also do not need to be located so far from each other.

Meanwhile, since the first antenna group 310 and the third antenna group 330 have the same polarization and the second antenna group 320 and the fourth antenna group 340 may have the same polarization, the first antenna group 310 and the third antenna group 330 should be located far from each other so that they do not have correlation. Also, the second antenna group 320 and the fourth antenna group 340 should be located far from each other so that they do not have correlation. For example, a distance between the first and third antenna groups and a distance between the second and fourth antenna groups may be configured as $4\lambda$.

Also, distances between antennas included in each antenna group may be configured to be close enough so that correlation between the antennas may be guaranteed. For example, the distance between the antennas included in each antenna group may be configured to be $\lambda/2$.

In the configuration of the multiple antennas 300 shown in FIG. 3, each of the antenna groups 310 to 340 may operate as a single antenna. Accordingly, the multiple antennas 300 comprising 16 antennas may operate as four individual antennas.

Referring to FIG. 4, multiple antennas 400 according to still another example embodiment of the present invention may comprise four antenna groups 410 to 440, and each of the antenna groups may be arranged so that they form a column of the antenna groups.

The distances between the antenna groups may be configured to be far enough so that there is no correlation between the antenna groups. For example, the distance between the antenna groups may be configured to be $4\lambda$ ($\lambda$ is a wavelength of carrier frequency).

Also, distances between antennas included in each of the antenna groups 410, 420, 430, and 440 may be configured to be close enough so that correlation between the antennas may be guaranteed. For example, the distance between the antennas included in each antenna group may be configured to $\lambda/2$.

In the configuration of the multiple antennas 400 shown in FIG. 4, each of the antenna groups 410 to 440 may operate as a single antenna. Accordingly, the multiple antennas 400 comprising 16 antennas may operate as four individual antennas.

In FIGS. 2 to 4, for conveniences of explanation, examples of multiple antennas comprising 16 antennas constituting 4 antenna groups each of which includes 4 antennas were explained. However, the technical thought of the present invention is not limited to the examples shown in FIGS. 2 to 4. That is, in other example embodiments of the present invention, it is possible that multiple antennas having different number of total antennas, different number of antenna groups, different number of antennas included in each antenna group, different arrangement of antennas and antenna groups are used for the present invention.

Figure 5:
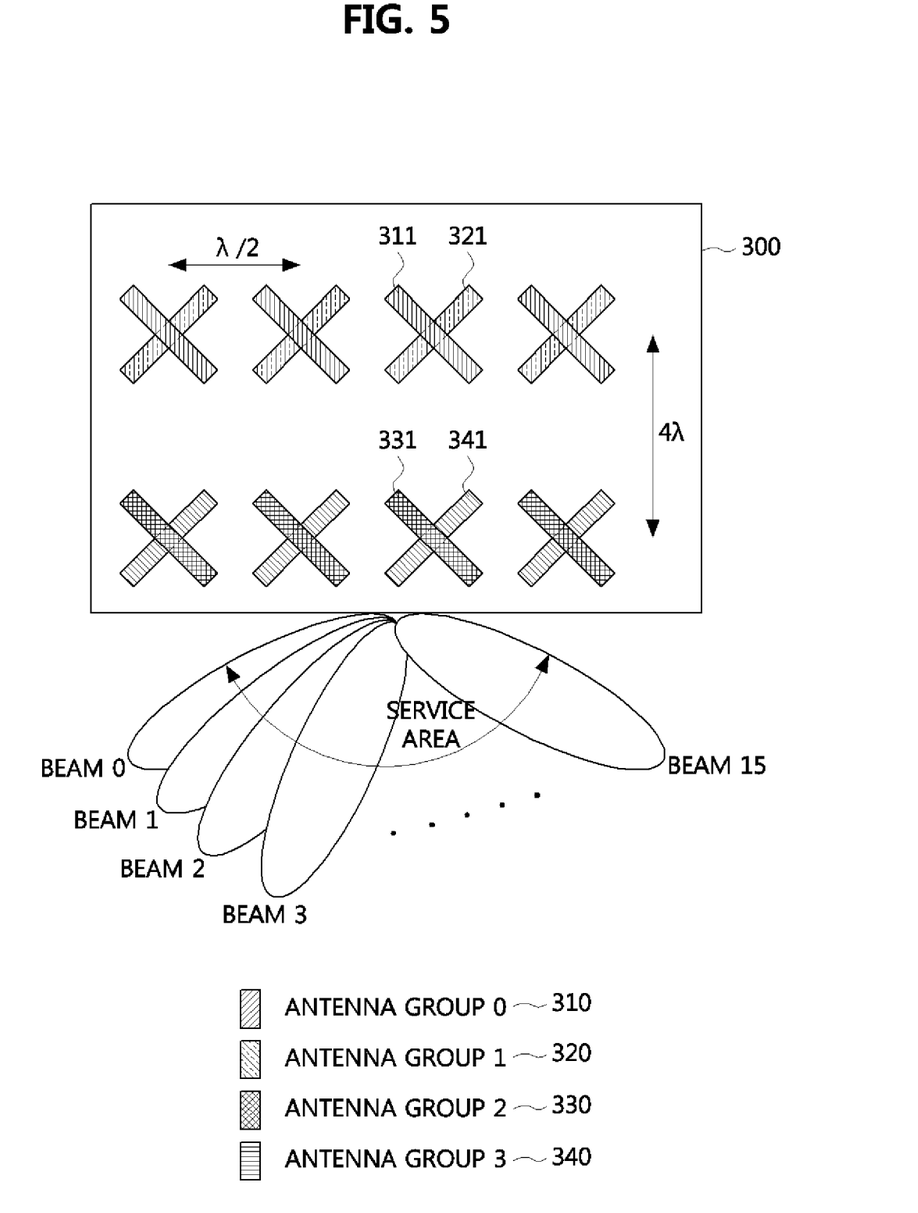
FIGS. 5 and 6 are conceptual diagrams to explain a method for beamforming in a method for transmitting signal using multiple antennas according to the present invention.
Figure 6:
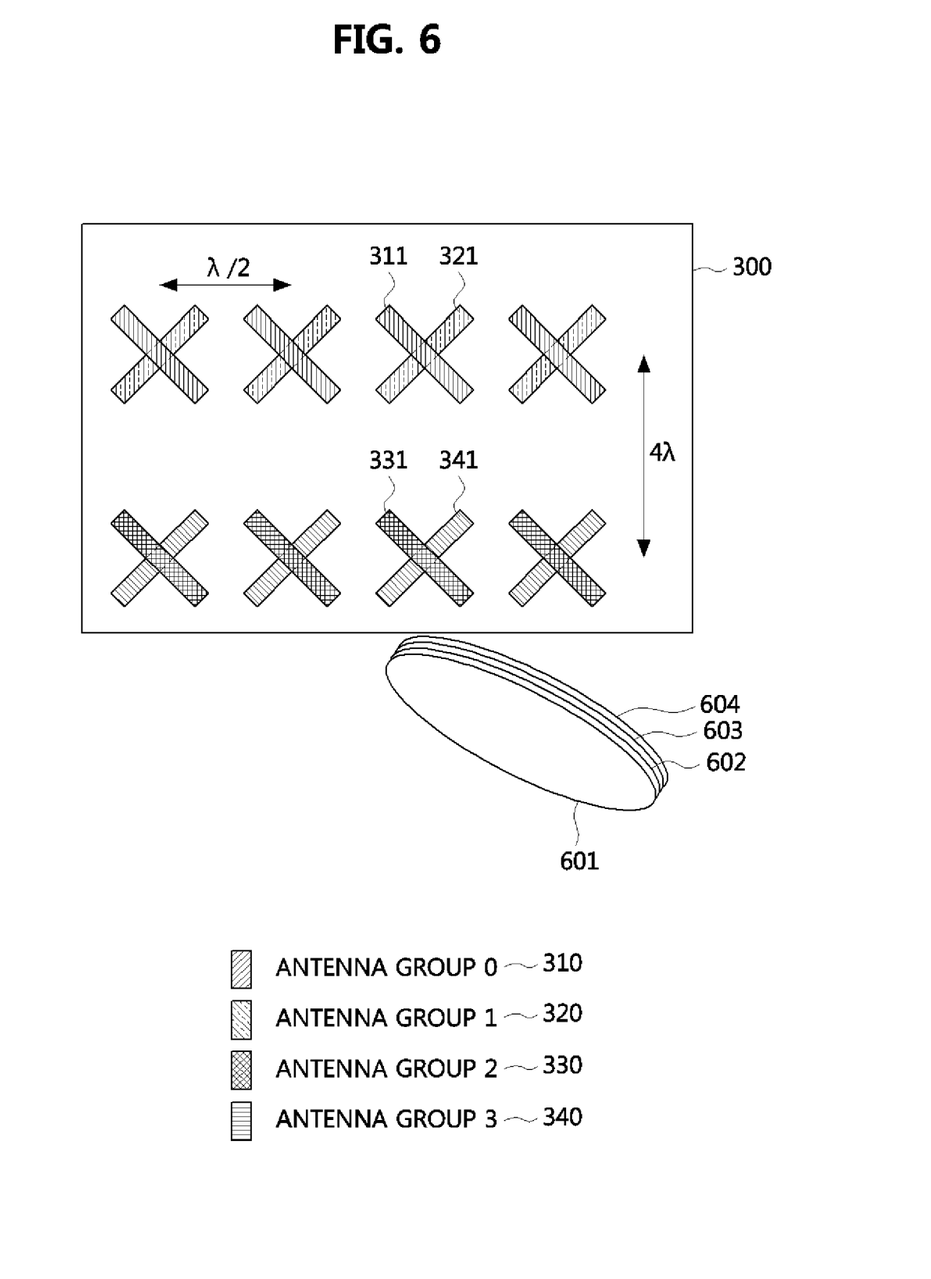

FIGS. 5 and 6 are conceptual diagrams to explain a method for beamforming in a method for transmitting signal using multiple antennas according to the present invention. Especially, a method for beamforming using the multiple antennas 300 illustrated in FIG. 3 is explained by referring to FIGS. 5 and 6.

In the configuration of the multiple antennas 300 shown in FIG. 3, a base station may form N fixed antenna radiation patterns (or, fixed beams) which can support whole service coverage by using antennas included in the first antenna group 310. Also, the base station may form N fixed antenna radiation patterns (or, fixed beams) which can support whole service coverage by using antennas included in the second antenna group 320. Also, the base station may form N fixed antenna radiation patterns (or, fixed beams) which can support whole service coverage by using antennas included in a third antenna group 330. Also, the base station may form N fixed antenna radiation patterns (or, fixed beams) which can support whole service coverage by using antennas included in the fourth antenna group 340.

Although fixed antenna radiation patterns which can be formed by the multiple antennas 300 of FIG. 3 are illustrated in FIG. 5, other example multiple antennas 200 and 400 of FIGS. 2 and 4 may form N fixed antenna radiation patterns which can support whole service coverage as shown in FIG. 5.

Also, for conveniences of explanation, in FIG. 5, explained was an example in which the number of fixed antenna radiation patterns supporting whole service coverage is set to 16. However, the number of fixed antenna radiation patterns is not limited to 16, and may vary according to the number of antennas constituting each antenna group, and/or unique radiation pattern of each antenna included in each antenna group.

The four antenna groups may form four beams toward the same direction, and the four beams may be overlapped so as to form each of the N fixed antenna radiation patterns illustrated in FIG. 5. That is, since each of the antenna groups 310 to 340 can transmit beam toward 16 directions illustrated in FIG. 5, each beam of FIG. 5 is practically formed by the four beams radiated toward the same direction overlapped.

FIG. 6 is a view to illustrate an example of a specific beam (beam 15) among 16 beams shown in FIG. 5.

As shown in FIG. 6, the beam 15 may be formed by four fixed beams overlapped, each of which is formed by each of antenna groups 310 to 340. Each of the beams (beam 0 to 15) shown in FIG. 5 may be formed by fixed beams heading for corresponding direction overlapped.

As shown in FIGS. 5 and 6, signals transmitted through 4 fixed antenna radiation patterns formed toward a specific direction may arrive at a receiver via different paths. For example, as shown in FIG. 6, signals transmitted through 4 fixed antenna radiation patterns (or, fixed beams) may arrive at a receiver via different radio channels or with different phases. In the present invention, as described above, since each of the antenna groups is configured to form a fixed beam for a specific direction, array gain may be achieved. In addition, since fixed beams formed by the antenna groups arrive at a receiver via different paths, multiplexing gain may be achieved.

That is, array gain and multiplexing gain may be achieved at the same time by using the multiple antennas as shown in FIGS. 2 to 6 and the above described method for beamforming in a method of transmitting signal using multiple antennas according to the present invention.

Hereinafter, a method for designing precoders and reference signals for achieving array gain and multiplexing gain will be explained in detail. For conveniences of explanation, it is assumed that distributed antenna system comprises four antenna groups each of which includes four antennas and has capability of forming 16 fixed beams toward 16 different directions. However, the method which will be explained below may be applied to any distributed antenna system with different configuration.

In order to achieve array gain and multiplexing gain at the same time, two precoders are required. That is, a first precoder $P_1$ for achieving array gain and a second precoder $P_2$ for achieving multiplexing gain are required.

Thus, a combined precoder P for achieving array gain and multiplexing gain at the same time may be represented as below equation 2, a function of $P_1$ and $P_2$.

$$P = f(P_1, P_2) \qquad \text{[Equation 1]}$$

A terminal may determine a precoder matrix index using reference signal (RS) transmitted from a base station, and report the determined precoder matrix index to the base station. The terminal may report two precoder matrix indexes (PMI-1 for $P_1$, and PMI-2 for $P_2$) to the base station.

Below is explanation on the precoder $P_1$.

PMI-1 is a set which comprises elements the number of which is the same as the number of antenna groups. In the present invention, since the number of antenna groups is assumed to be 4, PMI-1 is a set having 4 elements. Elements of the PMI-1 are integers, each of which has ranges [0 ... N−1]. Here, N is the predetermined number of fixed beams. In the present invention, the number of fixed beams is assumed to be 16, and so N=16.

When PIM-1 is an element of $\{k, n, i, j\}$, $P_1$ for each antenna group may be represent as below equation 2.

$$P_1 = \begin{cases} X_0^k; & \text{for antenna group 0} \\ X_1^n; & \text{for antenna group 1} \\ X_2^i; & \text{for antenna group 2} \\ X_3^j; & \text{for antenna group 3} \end{cases} \quad \text{[Equation 2]}$$

In the equation 2, $X_l^m$ represents $P_1$ for mth fixed beam of lth antenna group, and it is a 4×1 vector. Here, 4 is the number of antennas constituting each antenna group. Thus, $X_l^m$ may be represented as below equation 3.

$$X_l^m = \begin{bmatrix} X_l^m(0) \\ X_l^m(1) \\ X_l^m(2) \\ X_l^m(3) \end{bmatrix} \quad \text{[Equation 3]}$$

In the equation 3, $\{X_l^m(0), X_l^m(1), X_l^m(2), X_l^m(3)\}$ are coefficients used for lth antenna group to form mth fixed beam.

Below is explanation on the precoder $P_2$ for utilizing an effect of multiplexing.

First, $W_k$ may be defined as below equation 4 for explaining $P_2$.

$$W_k = I - 2\frac{u_k u_k^H}{u_k^H u_k} \quad \text{[Equation 4]}$$

In the equation 4, I may mean an 4×4 identity matrix, and $u_k$ may mean an input vector of householder generation function which is defined as table 1. The table 1 may represent values used in a 3rd Generation Project Partnership (3GPP) Long Term Evolution (LTE) system as $u_k$ when the number of antennas is 4. However, values not represented in the table 1 may be used. Also, when the number of antennas is not 4, values in the table 1 cannot be used, and other values should be used for $u_k$.

TABLE 1

| $u_0$ | $u_1$ | $u_2$ | $u_3$ | $u_4$ |
|---|---|---|---|---|
| $\begin{bmatrix} 1 \\ -1 \\ -1 \\ -1 \end{bmatrix}$ | $\begin{bmatrix} 1 \\ -j \\ 1 \\ j \end{bmatrix}$ | $\begin{bmatrix} 1 \\ 1 \\ -1 \\ 1 \end{bmatrix}$ | $\begin{bmatrix} 1 \\ j \\ 1 \\ -j \end{bmatrix}$ | $\begin{bmatrix} 1 \\ \frac{-1-j}{\sqrt{2}} \\ -j \\ \frac{1-j}{\sqrt{2}} \end{bmatrix}$ |

| $u_5$ | $u_6$ | $u_7$ | $u_8$ | $u_9$ |
|---|---|---|---|---|
| $\begin{bmatrix} 1 \\ \frac{1-j}{\sqrt{2}} \\ j \\ \frac{-1-j}{\sqrt{2}} \end{bmatrix}$ | $\begin{bmatrix} 1 \\ \frac{1+j}{\sqrt{2}} \\ -j \\ \frac{-1+j}{\sqrt{2}} \end{bmatrix}$ | $\begin{bmatrix} 1 \\ \frac{-1+j}{\sqrt{2}} \\ j \\ \frac{1+j}{\sqrt{2}} \end{bmatrix}$ | $\begin{bmatrix} 1 \\ -1 \\ 1 \\ 1 \end{bmatrix}$ | $\begin{bmatrix} 1 \\ -j \\ -1 \\ -j \end{bmatrix}$ |

| $u_{10}$ | $u_{11}$ | $u_{12}$ | $u_{13}$ | $u_{14}$ | $u_{15}$ |
|---|---|---|---|---|---|
| $\begin{bmatrix} 1 \\ 1 \\ 1 \\ -1 \end{bmatrix}$ | $\begin{bmatrix} 1 \\ j \\ -1 \\ j \end{bmatrix}$ | $\begin{bmatrix} 1 \\ -1 \\ -1 \\ 1 \end{bmatrix}$ | $\begin{bmatrix} 1 \\ -1 \\ 1 \\ -1 \end{bmatrix}$ | $\begin{bmatrix} 1 \\ 1 \\ -1 \\ -1 \end{bmatrix}$ | $\begin{bmatrix} 1 \\ 1 \\ 1 \\ 1 \end{bmatrix}$ |

The table 2 represents a method for determining a precoder $P_2$ for PMI-2 when the number of antenna groups is 4. $P_2$ may be determined using the equation 4 and the table 1. In the table 2, $W_k^{\{1\}}$ may mean a first column of a matrix $W_k$. $W_k^{\{12\}}$ may mean a first column and a second column of the matrix $W_k$. $W_k^{\{14\}}$ may mean a first column and a fourth column of the matrix $W_k$. $W_k^{\{123\}}$ may mean a first column, a second column, and a third column of the matrix $W_k$. $W_k^{\{1234\}}$ may mean all columns of the matrix $W_k$.

TABLE 2

| | | number of layers | | | |
|---|---|---|---|---|---|
| PMI-2 | $u_n$ | 1 | 2 | 3 | 4 |
| 0 | $u_0$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2$ | $W_2^{\{1\}}$ | $W_2^{\{12\}}/\sqrt{2}$ | $W_2^{\{123\}}/\sqrt{3}$ | $W_2^{\{1234\}}/2$ |
| 3 | $u_3$ | $W_3^{\{1\}}$ | $W_3^{\{12\}}/\sqrt{2}$ | $W_3^{\{123\}}/\sqrt{3}$ | $W_3^{\{1234\}}/2$ |
| 4 | $u_4$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6$ | $W_6^{\{1\}}$ | $W_6^{\{13\}}/\sqrt{2}$ | $W_6^{\{134\}}/\sqrt{3}$ | $W_6^{\{1234\}}/2$ |
| 7 | $u_7$ | $W_7^{\{1\}}$ | $W_7^{\{13\}}/\sqrt{2}$ | $W_7^{\{134\}}/\sqrt{3}$ | $W_7^{\{1234\}}/2$ |
| 8 | $u_8$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10}$ | $W_{10}^{\{1\}}$ | $W_{10}^{\{13\}}/\sqrt{2}$ | $W_{10}^{\{123\}}/\sqrt{3}$ | $W_{10}^{\{1234\}}/2$ |
| 11 | $u_{11}$ | $W_{11}^{\{1\}}$ | $W_{11}^{\{13\}}/\sqrt{2}$ | $W_{11}^{\{134\}}/\sqrt{3}$ | $W_{11}^{\{1234\}}/2$ |
| 12 | $u_{12}$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13}$ | $W_{13}^{\{1\}}$ | $W_{13}^{\{13\}}/\sqrt{2}$ | $W_{13}^{\{123\}}/\sqrt{3}$ | $W_{13}^{\{1234\}}/2$ |
| 14 | $u_{14}$ | $W_{14}^{\{1\}}$ | $W_{14}^{\{13\}}/\sqrt{2}$ | $W_{14}^{\{123\}}/\sqrt{3}$ | $W_{14}^{\{1234\}}/2$ |
| 15 | $u_{15}$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

When the number of antenna groups is 4 and so the number of receive antennas at a receiver is more than 4, rank of the MIMO channel may be one of 1, 2, 3, and 4.

When a rank is 1, $P_2$ may be represented as below equation 5.

$$P_2 \in \{W_0^{\{1\}}, W_1^{\{1\}}, W_2^{\{1\}}, W_3^{\{1\}}, W_4^{\{1\}}, W_5^{\{1\}}, W_6^{\{1\}}, \\ W_7^{\{1\}}, W_8^{\{1\}}, W_9^{\{1\}}, W_{10}^{\{1\}}, W_{11}^{\{1\}}, W_{12}^{\{1\}}, \\ W_{13}^{\{1\}}, W_{14}^{\{1\}}, W_{14}^{\{1\}}\} \quad \text{[Equation 5]}$$

When a terminal report PMI-1 as an element of {k, n, i, j} and PMI-2 as m, a base station may configure a precoder P as below equation 6.

$$P = f(P_1, P_2) = \begin{cases} X_0^k \cdot W_m^{\{1\}}(0); & \text{for antenna group 0} \\ X_1^n \cdot W_m^{\{1\}}(1); & \text{for antenna group 1} \\ X_2^i \cdot W_m^{\{1\}}(2); & \text{for antenna group 2} \\ X_3^j \cdot W_m^{\{1\}}(3); & \text{for antenna group 3} \end{cases}$$

[Equation 6]

In this case, $W_m^{\{1\}}(0)$ may mean a first element of $W_m^{\{1\}}$. The same data d are inputted to each antenna group. When PMI-1 of xth antenna group is n and PMI-2 of the xth antenna group is m, signal outputted from yth antenna of the xth antenna group may be represented as $X_x^n(y)W_m^{\{1\}}(x)d$.

When the rank is 2, $P_2$ may be represented as below equation 7.

$$P_2 \in \{W_0^{\{14\}}/\sqrt{2}, W_1^{\{12\}}/\sqrt{2}, W_2^{\{12\}}/\sqrt{2}, W_3^{\{12\}}/\sqrt{2}, W_4^{\{14\}}/\sqrt{2}, W_5^{\{14\}}/\sqrt{2}, W_6^{\{13\}}/\sqrt{2}, W_7^{\{13\}}/\sqrt{2}, W_8^{\{14\}}/\sqrt{2}, W_9^{\{14\}}/\sqrt{2}, W_{10}^{\{13\}}/\sqrt{2}, W_{11}^{\{13\}}/\sqrt{2}, W_{12}^{\{12\}}/\sqrt{2}, W_{13}^{\{13\}}/\sqrt{2}, W_{14}^{\{13\}}/\sqrt{2}, W_{15}^{\{12\}}/\sqrt{2}\}$$

[Equation 7]

When a terminal report PMI-1 as an element of {k, n, i, j} and PMI-2 as m, a base station may configure a precoder P as below equation 8.

$$P = f(P_1, P_2) = \begin{cases} X_0^k \cdot (W_m^{\{c1\}}(0)d(0) + W_m^{\{c2\}}(0)d(1)); & \text{for antenna group 0} \\ X_1^n \cdot (W_m^{\{c1\}}(1)d(0) + W_m^{\{c2\}}(1)d(1)); & \text{for antenna group 1} \\ X_2^i \cdot (W_m^{\{c1\}}(2)d(0) + W_m^{\{c2\}}(2)d(1)); & \text{for antenna group 2} \\ X_3^j \cdot (W_m^{\{c-1\}}(3)d(0) + W_m^{\{c2\}}(3)d(1)) & \text{for antenna group 3} \end{cases}$$

[Equation 8]

In this case, $W_m^{\{c_1\}}$ may mean a first column of $W_m$, and $W_m^{\{c_2\}}$ may mean a second column of $W_m$. Also, $W_m^{\{c1\}}(i)$ may mean a (i-1)th element of $W_m^{\{c_1\}}$. Thus, $W_{14}^{\{c_1\}}=W_{14}^{\{1\}}$ and $W_{14}^{\{c_2\}}=W_{14}^{\{3\}}$. Data inputted to each antenna group may be linearly combined value of d(0), d(1). When PMI-1 of xth antenna group is n and PMI-2 of the xth antenna group is m, signal outputted from yth antenna of the xth antenna group may be $X_x^n(y)\cdot(W_m^{\{c1\}}(x)d(0)+W_m^{\{c2\}}(x)d(1))$.

When the rank is 3, $P_2$ may be represented as below equation 9.

$$P_2 \in \{W_0^{\{124\}}/\sqrt{3}, W_1^{\{123\}}/\sqrt{3}, W_2^{\{123\}}/\sqrt{3}, W_3^{\{123\}}/\sqrt{3}, W_4^{\{124\}}/\sqrt{3}, W_5^{\{124\}}/\sqrt{3}, W_6^{\{134\}}/\sqrt{3}, W_7^{\{134\}}/\sqrt{3}, W_8^{\{124\}}/\sqrt{3}, W_9^{\{134\}}/\sqrt{3}, W_{10}^{\{123\}}/\sqrt{3}, W_{11}^{\{134\}}/\sqrt{3}, W_{12}^{\{123\}}/\sqrt{3}, W_{13}^{\{123\}}/\sqrt{3}, W_{14}^{\{123\}}/\sqrt{3}, W_{15}^{\{132\}}/\sqrt{3}\}$$

[Equation 9]

When a terminal report PMI-1 as an element of {k, n, i, j} and PMI-2 as m, a base station may configure a precoder P as below equation 10.

$$P = f(P_1, P_2)$$

[Equation 10]

$$= \begin{cases} X_0^k \cdot (W_m^{\{c1\}}(0)d(0) + W_m^{\{c2\}}(0)d(1) + W_m^{\{c3\}}(0)d(2)); & \text{for antenna group 0} \\ X_1^n \cdot (W_m^{\{c1\}}(1)d(0) + W_m^{\{c2\}}(1)d(1) + W_m^{\{c3\}}(1)d(2)); & \text{for antenna group 1} \\ X_2^i \cdot (W_m^{\{c1\}}(2)d(0) + W_m^{\{c2\}}(2)d(1) + W_m^{\{c3\}}(1)d(2)); & \text{for antenna group 2} \\ X_3^j \cdot (W_m^{\{c1\}}(3)d(0) + W_m^{\{c2\}}(3)d(1) + W_m^{\{c3\}}(1)d(2)); & \text{for antenna group 3} \end{cases}$$

In this case, $W_m^{\{c_1\}}$ may mean a first column of $W_m$, and $W_m^{\{c_2\}}$ may mean a second column of $W_m$, and $W_m^{\{c_3\}}$ may mean a third column of $W_m$. Also, data inputted to each antenna group may be linearly combined value of d(0), d(1), d(2). When PMI-1 of xth antenna group is n and PMI-2 of the xth antenna group is m, signal outputted from yth antenna of the x th antenna group may be represented as $X_x^n(y)\cdot(W_m^{\{c_1\}}(x)d(0)+Wmc2\times d1+Wmc3\times d2)$.

When the rank is 4, $P_2$ may be represented as below equation 11.

$$P_2 \in \{W_0^{\{1234\}}/2, W_1^{\{1234\}}/2, W_2^{\{1234\}}/2, W_3^{\{1234\}}/2, W_4^{\{1234\}}/2, W_5^{\{1234\}}/2, W_6^{\{1234\}}/2, W_7^{\{1234\}}/2, W_8^{\{1234\}}/2, W_9^{\{1234\}}/2, W_{10}^{\{1234\}}/2, W_{11}^{\{1234\}}/2, W_{12}^{\{1234\}}/2, W_{13}^{\{1234\}}/2, W_{14}^{\{1234\}}/2, W_{15}^{\{1234\}}/2\}$$

[Equation 11]

When a terminal report PMI-1 as an element of {k, n, i, j} and PMI-2 as m, a base station may configure a precoder P as below equation 12.

$$P = f(P_1, P_2)$$

[Equation 12]

$$= \begin{cases} X_0^k \cdot (W_m^{\{c1\}}(0)d(0) + W_m^{\{c2\}}(0)d(1) + W_m^{\{c3\}}(0)d(2) + W_m^{\{c4\}}(0)d(3)); & \text{for antenna group 0} \\ X_1^n \cdot (W_m^{\{c1\}}(1)d(0) + W_m^{\{c2\}}(1)d(1) + W_m^{\{c3\}}(1)d(2) + W_m^{\{c4\}}(0)d(3)); & \text{for antenna group 1} \\ X_2^i \cdot (W_m^{\{c1\}}(2)d(0) + W_m^{\{c2\}}(2)d(1) + W_m^{\{c3\}}(1)d(2) + W_m^{\{c4\}}(0)d(3)); & \text{for antenna group 2} \\ X_3^j \cdot (W_m^{\{c1\}}(3)d(0) + W_m^{\{c2\}}(3)d(1) + W_m^{\{c3\}}(1)d(2) + W_m^{\{c4\}}(0)d(3)); & \text{for antenna group 3} \end{cases}$$

In this case, $W_m^{\{c_1\}}$ may mean a first column of $W_m$, and $W_m^{\{c_2\}}$ may mean a second column of $W_m$, and $W_m^{\{c_3\}}$ may mean a third column of $W_m$, and $W_m^{\{c_4\}}$ may mean a fourth column of $W_m$. Also, data inputted to each antenna group may be linearly combined value of d(0), d(1), d(2), d(3). When PMI-1 of xth antenna group is n and PMI-2 of the xth antenna group is m, signal outputted from yth antenna of the xth antenna group may be represented as $X_x^n(y) \cdot (W_m^{\{c1\}}(x)$ d(0)+$W_m^{\{c2\}}$(x)d(1)+$W_m^{\{c3\}}$(x)d(2)+Wmc4×d3.

A method for transmitting signal using multiple antennas according to the present invention may be used for Single User MIMO (SU-MIMO) or Multi User MIMO (MU-MIMO), or also may be used for a case that SU-MIMO and MU-MIMO are performed simultaneously.

Figure 7:
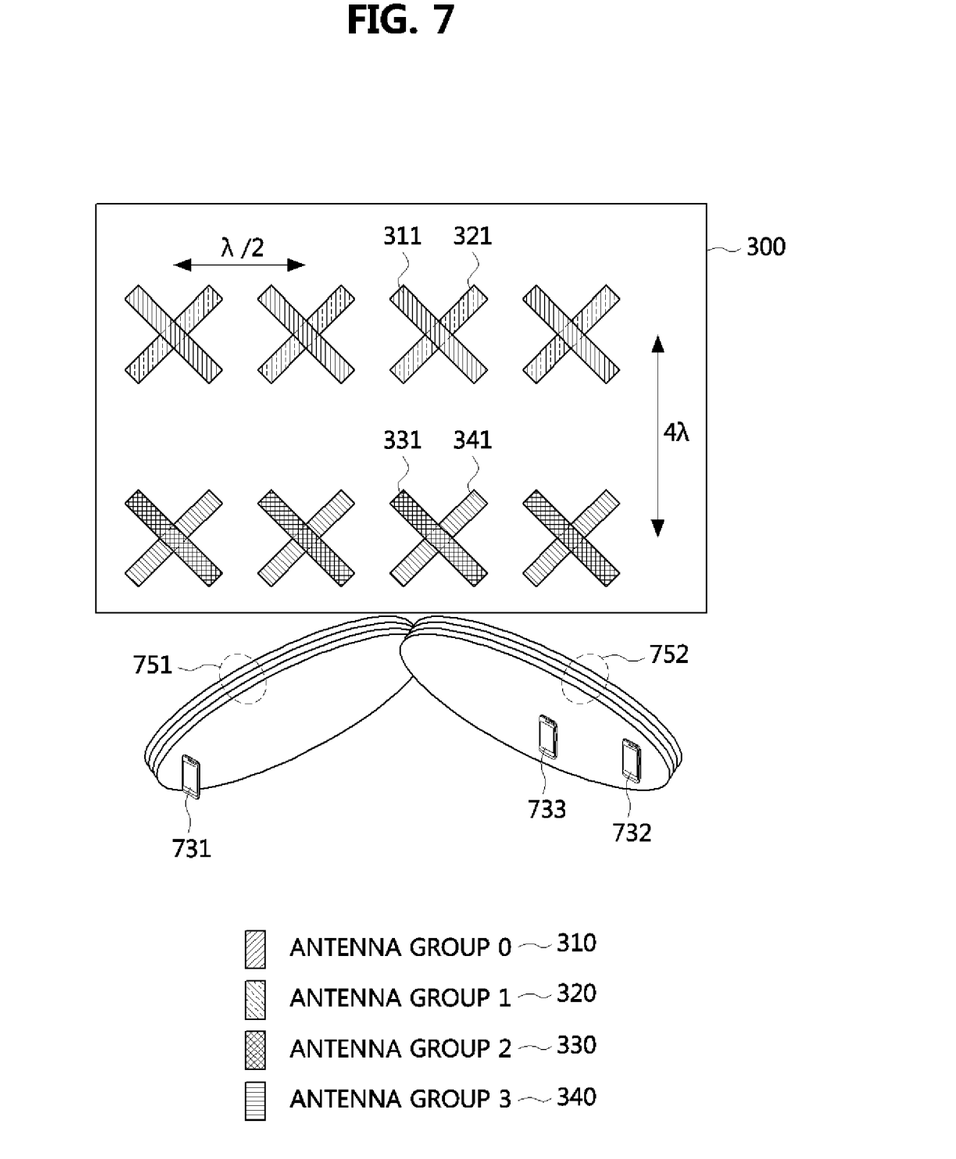
FIG. 7 is a conceptual diagram to explain a method for transmitting signal using multiple antennas according to the present invention.

FIG. 7 is a conceptual diagram to explain a method for transmitting signal using multiple antennas according to the present invention.

In FIG. 7, an example in which a base station performs SU-MIMO and MU-MIMO simultaneously for terminal located apart from each other is illustrated. When it is assumed that the base station comprises 4 antenna groups 310 to 340 each of which includes 4 antennas, and each of terminals 731, 732, and 733 comprises up to four antennas, the maximum rank is 4.

Referring to FIG. 7, the terminal 731 may receive signal through four beams 751 formed using four antenna groups 310 to 340. Also, the terminal 732 may receive signal through four beams 752 formed using four antenna groups. Here, since a direction of the beams 751 radiated towards the terminal 731 and a direction of the beams 752 radiated towards the terminal 732 are different, the base station may utilize the same spectrum to transmit different signals to the terminals 731 and 732 at the same time. In this case, each of the terminals 731 and 732 may receive up to four signals multiplexed at the same time.

As described below, each of the terminals 731 to 733 may select rank, PMI-1, and PMI-2 based on the reference signal transmitted from the base station, and report the selected to the base station.

Meanwhile, when the terminal 731 is assumed to comprise 4 receive antennas, a maximum value of rank of MIMO channel between the base station and the terminal 731 may be 4. Therefore, the base station may transmit signals to the terminal 731 by reusing spectrum up to the reported rank number with reference to the rank, the PMI-1, and the PMI-2 reported from the terminal. That is, the base station can use multiple antenna groups to transmit signals to the single terminal in the SU-MIMO manner.

Also, the base station may perform MU-MIMO based on channel information (rank, PMI-1, and PMI-2) reported by each of the terminals 732 and 733.

When the terminals 732 and 733 use the same $P_1$ and different $P_2$, the base station may perform MU-MIMO to transmit signals to the two terminals.

As an example, when the terminals 732 and 733 use the same $P_1$ and different $P_2$ with rank of 2, the base station may perform SU-MIMO and MU-MIMO simultaneously since rank-2 precoding can be applied to each of the terminals.

Hereinafter, a method of channel information feedback performed in a terminal will be explained.

A terminal may report rank, PMI-1, and PMI-2 of MIMO channel between transmit antennas of a base station and receive antennas of the terminal to the base station. The terminal may measure the rank, the PMI-1, and the PMI-2 using reference signal transmitted from the base station. Also, time-frequency resources should be allocated in downlink for the base station to transmit reference signal through the allocated resources.

Although the reference signal may be transmitted as not precoded, the reference signal is assumed to be transmitted as precoded in example embodiments of the present invention.

The reference signal may be generated using Pseudo Noise (PN) sequence and Orthogonal Cover Code (OCC) sequence. Also, it may be possible that only the precoding $P_1$ is applied for the reference signal, and the precoding $P_2$ is not applied for the reference signal.

Since beams using different $P_1$ are spatially apart from each other when the reference signal to which the $P_1$ precoding is applied is transmitted, the reference signals transmitted through N fixed beams formed by each antenna group may be transmitted using the same time-frequency resources. However, in this case, terminal performance of detecting reference signals may degrade due to interference between beams adjacent to each other.

In order to mitigate the above described interference between adjacent beams, different time-frequency resources may be used to transmit reference signal.

Alternatively, in order to mitigate the interference between beams, all the beams may be transmitted using the same time-frequency resources, but the transmission time of reference signal for each beam may be set differently. That is, time division multiplexing may be used to transmit reference signals for specific antenna groups.

Figure 8:
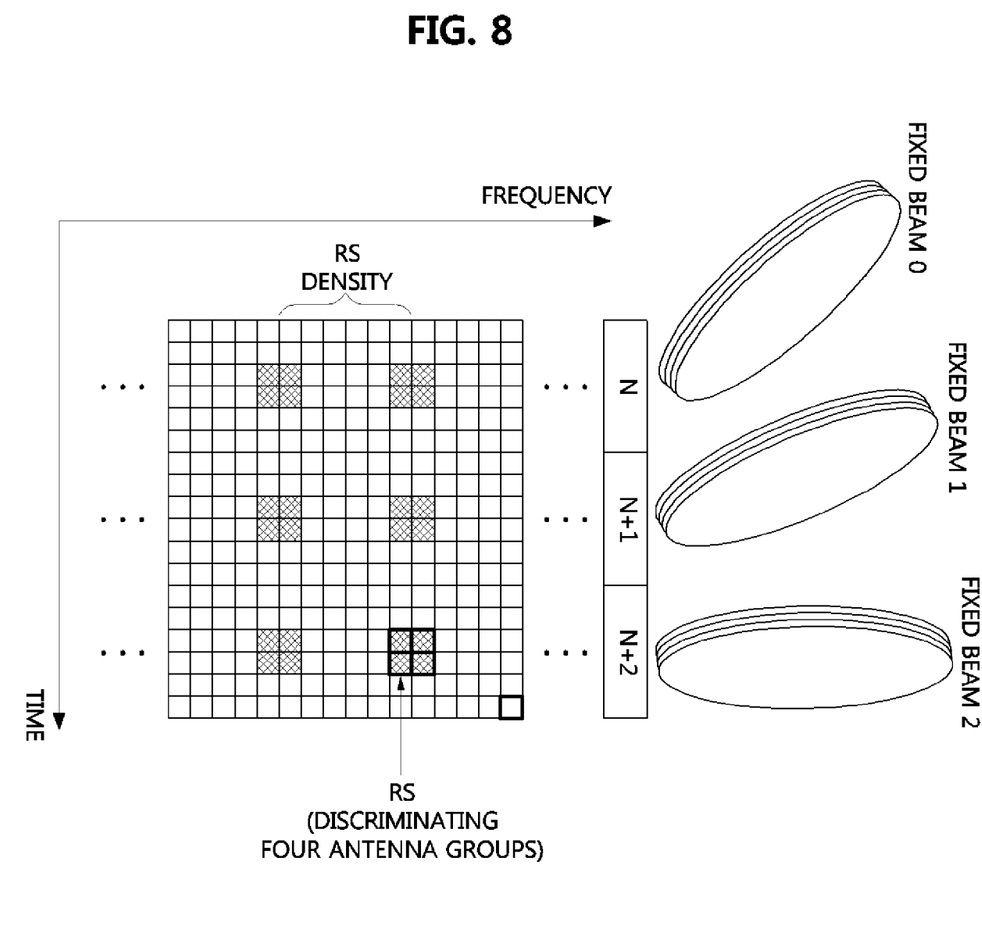
FIG. 8 is a conceptual diagram to explain a method for transmitting reference signal according to an example embodiment of the present invention.

FIG. 8 is a conceptual diagram to explain a method for transmitting reference signal according to an example embodiment of the present invention. Especially, FIG. 8 illustrates an example of time division multiplexing for transmitting reference signal.

When a base station comprises 4 antenna groups, four fixed beams using the same $P_1$ may exist. Thus, four reference signals may be required to discriminate fixed beams using the same $P_1$.

As shown in FIG. 8, each antenna group of the base station may transmit precoded reference signal through a fixed beam 0 in a time period n. In this case, precoding applied to each antenna group may be represented as below equation 13.

$$P_1 = \begin{cases} X_0^0; & \text{for antenna group } 0 \\ X_1^0; & \text{for antenna group } 1 \\ X_2^0; & \text{for antenna group } 2 \\ X_3^0; & \text{for antenna group } 3 \end{cases} \quad \text{[Equation 13]}$$

As shown in FIG. 8, time-frequency resources for transmitting four reference signals may comprise four adjacent resource elements (REs).

Also, the base station may transmit precoded four reference signals through a fixed beam 1 in a time period n+1, and precoded four reference signals through a fixed beam 2 in a time period n+2. In this case, if the number of values which PMI-1 may have is N, precoded four reference signals are transmitted through a fixed beam N−1 in a time period n+N−1.

The lengths of time period and the density of frequency resources in which the reference signals shown of FIG. 8 are transmitted may be configured variously according to environments.

Meanwhile, PN sequence may be used as reference signal in order to mitigate inter-cell interference and inter-beam interference. As initialization parameters for a PN sequence generator, at least one of a cell identifier, a beam identifier, and an index of time period may be used. A PN sequence generated in a specific time duration may be mapped to resource elements allocated in the specific time period.

When k adjacent four resource elements are allocated for transmitting reference signal in a time duration, a length of necessary PN sequence may be 4 k.

As methods for discriminating four reference signals transmitted in each time duration, a time division multiplexing (TDM), a Frequency Division Multiplexing (FDM), and a Code Division Multiplexing (CDM) may be used. In the present invention, a case of using CDM will be explained as an example.

In FIG. 8, an example of resource allocation in which adjacent four resource elements are used to transmit four references signals is explained.

Here, it is possible to use OCC of length 4 such as length-4 Hardamard sequence to distinguish a reference signal of each antenna group from the four reference signals. There are four sequences $OCC_0$, $OCC_1$, $OCC_2$, $OCC_3$ for length-4 Hardamard sequence. Here, $OCC_0$ is allocated for a first antenna group, and $OCC_1$ is allocated for a second antenna group, and $OCC_2$ is allocated for a third antenna group, and $OCC_3$ is allocated for a fourth antenna group. Thus, reference signal of each antenna group may be distinguished from other reference signals for other antenna groups.

A time-frequency allocation comprising four adjacent resource elements is used to transmit a PN sequence multiplied by an OCC. At this time, P1 precoding is performed.

Also, hopping may be applied to transmission of the reference signals in order to prevent performance degradation due to collision between reference signals transmitted from cells.

Hereinafter, a method for generation Demodulation Reference Signal (DMRS) which is applied to the method for transmitting reference signal according to the present invention will be explained.

When a base station transmits data to a terminal, the base station may transmit DMRS with the data for the terminal to demodulate the data. The above described reference signals RS are for helping terminals to determine ranks, PMI-1, and PMI-2, and so RS s are transmitted for every terminals.

On the contrary, DMRS is transmitted for specific terminal since it is for helping specific terminal to demodulate data. Thus, it is preferred that RS and DMRS are transmitted using different time-frequency resources.

DMRS may be generated using a PN sequence multiplied by an OCC sequence, in which the PN and OCC sequences are generated for DMRS. Although RS is cell-specific or beam-specific signal, DMRS is UE-specific signal. Thus, an identifier of UE may be required to initialize PN generator for DMRS as well as cell UD, beam ID, and indexes of time durations. OCC sequences used for DMRS are for discriminating rank (or, layer) of multiplexed data transmitted from the base station, not for discriminating each antenna group.

The same precoding ($P=f(P_1, P_2)$) may be applied to DMRS and data.

Hereinafter, a method for enhancing cell edge performance and managing inter-cell interference in the method for transmitting signals according to the present invention will be explained.

Figure 9:
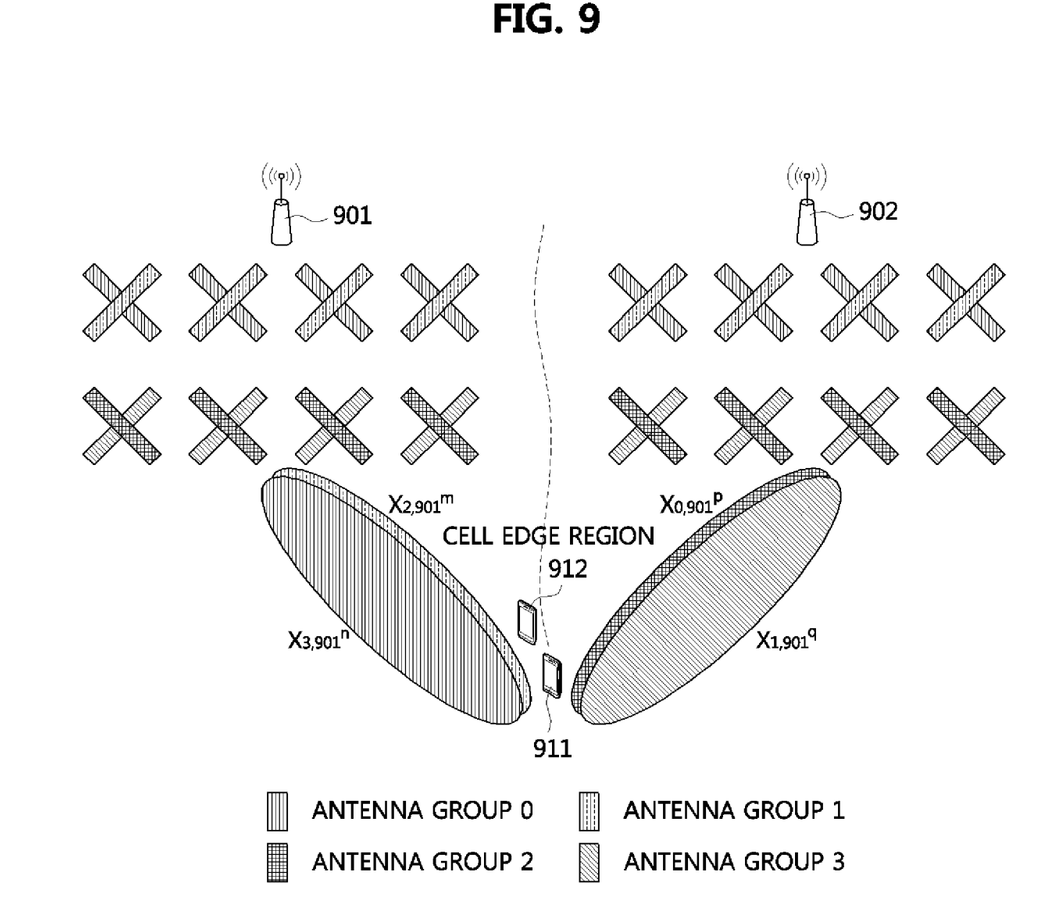
FIG. 9 is a conceptual diagram to explain a method for applying the method for transmitting signals according to the present invention to regions of cell edge.

FIG. 9 is a conceptual diagram to explain a method for applying the method for transmitting signals according to the present invention to regions of cell edge.

In FIG. 9, it is assumed that a first terminal 911 and a second terminal 912 are located in a cell edge region between a first cell provided by a first base station 901 and a second cell provided by a second base station. Also, the first base station 901 is assumed as a serving base station of the first and second terminal 911 and 912.

The first terminal 911 may determine PMI-1 using reference signal transmitted by four antenna groups of the first base station 901 as below equation 14.

$$\text{PMI-1} = \{X_{0,901}^k, X_{1,901}^l, X_{2,901}^m, X_{3,901}^n\} \quad \text{[Equation 14]}$$

$X_{i,901}^j$ means a fixed beam j of antenna group k of the first base station 901.

Similarly, the first terminal 911 may determine PMI-1 for the second base station 902 as below equation 15.

$$\text{PMI-1} = \{X_{0,902}^p, X_{1,902}^q, X_{2,902}^r, X_{3,902}^s\} \quad \text{[Equation 15]}$$

The first terminal 911 which calculated PMI-1s for the serving base station 901 and neighbor base station 902 may select several beams among $\{X_{0,902}^k, X_{1,902}^l, X_{2,902}^m, X_{3,902}^n, X_{0,902}^p, X_{1,902}^q, X_{2,902}^r, X_{3,902}^s\}$. For example, the first terminal 911 may select $\{X_{2,902}^m, X_{3,902}^n, X_{0,902}^p, X_{1,902}^q\}$ and determine PMI-2 for the selected four fixed beams.

Then, the first terminal 911 may report PMI-1 and PMI-2 to the first base station 901, the serving station, and the first base station 901 may report PMI-1 and PMI-2 of the first terminal 911 to the second terminal 902 via inter-base station interface. Here, when inter-base station communication is not available, the first terminal 911 may be configured to report PMI-1 and PMI-2 to both the first and second base stations 901 and 902 simultaneously.

As explained above, the first and second base stations 901 and 902 may perform joint precoding based on the reported PMI-1 and PMI-2 so as to enhance receiving performance of the first terminal 911. Alternatively, the first and second base stations 901 and 902 may perform MU-MIMO scheduling considering information reported by both the first terminal 911 and the second terminal 912 so as to increase efficiency of spectrum use.

Although an example in which a terminal selects four beams among eight beams formed by two base station, and reports the selected beams to a serving base station was explained for an example of the present invention, the technical thought of the present invention is not limited to the above specific example. That is, in other example embodiments of the present invention, a terminal may select different number of beams, and report selected beams to a base station. However, in these cases, different designs of precoders are needed.

As explained above, the method for transmitting signal according to the present invention may be applied to control channel transmission as well as data channel transmission, and increase system capacity.

First, a case in which the method according to the present invention is applied to data channel transmission is explained.

A terminal may determine rank, PMI-1, and PMI-2 using reference signals received from a base station, and report the determined information to the base station.

Here, maximum rank which the terminal can determined may be given as below equation 16.

$$\text{rank}_{max} = \min\begin{pmatrix} \text{the number of antenna groups in a base \textit{staiton},} \\ \text{the number of receive antennas in a terminal} \end{pmatrix} \quad \text{[Equation 16]}$$

In the above described example embodiment of the present invention, it is assumed that a base station comprises four antenna groups, and a terminal comprises four receive antennas. Thus, SU-MIMO using up to four layers may be performed.

Also, MU-MIMO may be applied to terminals having different PMI-2 among terminals reporting the same PMI-1. For example, when two terminals with rank of 2 report the same PMI-1 information to a base station, the base station may provide services to the two terminal using two layers for each terminal if PMI-2s of the two terminals are different.

Also, in the method according to the present invention, receiving performance of terminals located at cell edge may be enhanced and inter-cell interference may be managed efficiently by applying cooperative MIMO (joint MIMO) to terminals located at cell edge.

Since a level of SNR required for spatial multiplexing (SM) utilizing multiplexing effect is high, a probability of using SM at cell edge region is not so high. In this case, a region in which multiplexing effect can be used may be enlarged by using array gain so as to increase system capacity.

Hereinafter, a case in which the method according to the present invention is applied to control channel transmission is explained.

Control channel is transmitted to not a specific terminal but every terminals. Accordingly, a base station may form omni-directional beams so as to support whole service areas for transmitting control channel. Hereinafter, a beam formed by a base station for supporting entire service areas is termed as a 'omni beam'. The beam width of omni-beams may be any one of 120 degrees, 360 degrees, etc., according to a configuration of the cell.

Since a precoder $P_2$ is not used for control channel, $P=P_1$. Also, since $P_1$ means a precoder for a beam supporting entire service area, $P_1$ may be represented as $P_{omni}$. Since $P_{omni}$ is a predefined value, it is not necessary that a terminal reports rank, PMI-1, and PMI-2 to the base station. Also, the terminal identifies as the base station comprises the same number of transmit antennas as the number of antenna groups.

The base station may not transmit reference signal for control channel. However, the base station is requires to transmit control channel DMRS (CCDMRS) to a terminal so that the terminal can perform coherent demodulation on the control channel. The same precoding as applied to the control channel, that is, $P_{omni}$ may be applied to the CCD-MRS.

On the other hand, in the method for transmitting signal according to the present invention, a technology of transmit diversity may be applied to transmission of control channel according to the number of antenna groups. In this case, a terminal should be able to discriminate CCDMRSs transmitted from the multiple antenna groups. The CCDMRs may be transmitted as multiplexed by at least one of TDM, FDM, and CDM methods.

For example, Space Frequency Block Coding (SFBC) may be applied when the number of antenna groups is 2, and Frequency Switched Transmit Diversity (FSTD) or Full Diversity Full Rate (FDFR) may be applied when the number of antenna groups is 4.

As described above, the method according to the present invention may be applied to transmission of control channel and data channel, and cooperative MIMO by cooperation between base stations.

The above described invention for transmitting signal using multiple antennas provides configurations of antennas, a method of designing precoders, reference signals, and reference signals for demodulation for achieving array gain and multiplexing gain at the same time.

The method for transmitting signals using multiple antennas according to the present invention may be applied to transmission of both data channel and control channel, and may be used to enhance receiving performances of terminals located at cell edge regions and to mitigate inter-cell interferences.

Also, according to the method of the present invention, SU-MIMO in which the same spectrum is used to transmit data to a specific terminal through a plurality of layers may be performed, and MU-MIMO in which the same spectrum is used to transmit data to a plurality of terminals simultaneously may be performed.

Accordingly, system capacity as well as capacity of data channel and control channel may be significantly increased through mitigation of inter-cell interference and enhancement of cell edge performance.

While the example embodiments of the present invention and their advantages have been described in detail, it should be understood that various changes, substitutions and alterations may be made herein without departing from the scope of the invention.

What is claimed is:

1. A method for transmitting signals, performed in a base station, comprising:

transmitting a first reference signal for each antenna group and a second reference signal for each directional beam to a terminal;

receiving a first precoder matrix index (PMI-1) and a second precoder matrix index (PMI-2), which are calculated based on the first reference signal and the second reference signal, from the terminal; and performing precoding on downlink data and a third reference signal for demodulation of the downlink data (DMRS) based on a first precoder ($P_1$) corresponding to the first precoder matrix index and a second precoder ($P_2$) matrix corresponding to the second precoder matrix index, wherein the first precoder is a precoding matrix for each of a plurality antenna groups to form directional beam, and the second precoder is a precoding matrix for achieving multiplexing gain using the directional beam, wherein the first precoder $P_1$ is determined according to the first precoder matrix index (PMI-1) received from the terminal as following equation, $$P_1 = \begin{cases} X_0^k; & \text{for antenna group 0} \\ X_1^n; & \text{for antenna group 1} \\ X_2^i; & \text{for antenna group 2} \\ X_3^j; & \text{for antenna group 3} \end{cases}$$

wherein $X_l^m$ means a mth fixed beam of lth antenna group, PMI-1 is an element of $\{k, n, i, j\}$.

2. The method of claim 1, wherein the first, second, and third reference signals are generated by using Pseudo-Noise (PN) sequence and Orthogonal Cover Code (OCC) sequence.

3. The method of claim 2, wherein the first, second, and third reference signals are generated by multiplying the PN sequence and one of OCC sequences, wherein a number of the OCC sequence is the same as a number of antenna groups.

4. The method of claim 2, wherein the PN sequence is initialized in each time period configured with a predetermined interval.

5. The method of claim 2, wherein the PN sequence is initialized using at least one of a cell identifier, a beam identifier, and an index of time period.

6. The method of claim 1, wherein the precoding on the third reference signal is performed using only the first precoder $P_1$ not the second precoder $P_2$.

7. The method of claim 1, wherein the first, second, and third reference signals are not transmitted using the same time-frequency resources at the same time in order to mitigate interference between adjacent directional beams formed by the same antenna group, and the adjacent directional beams are applied to the first, second, and third reference signals.

8. The method of claim 1, wherein the first, second, and third reference signals are transmitted using the same time-frequency resources when beams formed by the antenna groups are toward the same direction, and each of the first, second, and third reference signal is distinguished using PN sequence and OCC sequence, and the adjacent directional beams are applied to the first, second, and third reference signals.

9. The method of claim 1, wherein the performing precoding on the third reference signal for demodulation comprises:

generating the third reference signal for demodulation by multiplying Orthogonal Cover Code (OCC) sequence and Pseudo-Noise (PN) sequence which is initialized using at least one of an identifier of the terminal, a cell identifier, a beam identifier, and an index of time period;

performing precoding on the generated third reference signal for demodulation by using the first precoder $P_1$ and the second precoder $P_2$ which are applied to the precoding on the downlink data; and transmitting downlink signal comprising the precoded downlink data and the precoded third reference signal for demodulation to the terminal.

10. The method of claim 1, wherein when PMI-1 is an element of {k, n, i, j} and a rank is 1, the precoded downlink data is represented as following equation, $$\begin{cases} X_0^k \cdot W_m^{\{1\}}(0)d; & \text{for antenna group 0} \\ X_1^n \cdot W_m^{\{1\}}(1)d; & \text{for antenna group 1} \\ X_2^i \cdot W_m^{\{1\}}(2)d; & \text{for antenna group 2} \\ X_3^j \cdot W_m^{\{1\}}(3)d; & \text{for antenna group 3,} \end{cases}$$

wherein the $X_x^{PMI-1}$ represents the first precoder P1 of xth antenna group for a given PMI-1, and $W_m^{\{1\}}(i)$ is a (i−1)th element of the second precoder P2, and d is the same data inputted to each antenna group.

11. The method of claim 1, wherein when PMI-1 is an element of {k, n, i, j} and a rank is 2, the precoded downlink data is represented as following equation, $$\begin{cases} X_0^k \cdot (W_m^{\{c1\}}(0)d(0) + W_m^{\{c2\}}(0)d(1)); & \text{for antenna group 0} \\ X_1^n \cdot (W_m^{\{c1\}}(1)d(0) + W_m^{\{c2\}}(1)d(1)); & \text{for antenna group 1} \\ X_2^i \cdot (W_m^{\{c1\}}(2)d(0) + W_m^{\{c2\}}(2)d(1)); & \text{for antenna group 2} \\ X_3^j \cdot (W_m^{\{c1\}}(3)d(0) + W_m^{\{c2\}}(3)d(1)); & \text{for antenna group 3,} \end{cases}$$

wherein the $X_x^{PMI-1}$ represents the first precoder P1 of xth antenna group for a given PMI-1, and the $W_m^{\{c1\}}(i)$ is a (i−1)th element of a first column of the second precoder P2, and the $W_m^{\{c2\}}(i)$ is a (i−1)th element of a second column of the second precoder P2, and d(0) and d(1) are data streams.

12. The method of claim 1, wherein when PMI-1 is an element of {k, n, i, j} and a rank is 3, the precoded downlink data is represented as following equation, $$\begin{cases} X_0^k \cdot (W_m^{\{c1\}}(0)d(0) + W_m^{\{c2\}}(0)d(1) + W_m^{\{c3\}}(0)d(2)); & \text{for antenna group 0} \\ X_1^n \cdot (W_m^{\{c1\}}(1)d(0) + W_m^{\{c2\}}(1)d(1) + W_m^{\{c3\}}(1)d(2)); & \text{for antenna group 1} \\ X_2^i \cdot (W_m^{\{c1\}}(2)d(0) + W_m^{\{c2\}}(2)d(1) + W_m^{\{c3\}}(1)d(2)); & \text{for antenna group 2} \\ X_3^j \cdot (W_m^{\{c1\}}(3)d(0) + W_m^{\{c2\}}(3)d(1) + W_m^{\{c3\}}(1)d(2)); & \text{for antenna group 3,} \end{cases}$$

wherein the $X_x^{PMI-1}$ represents the first precoder P1 of xth antenna group for a given PMI-1, and the $W_m^{\{c1\}}(i)$ is a (i−1)th element of a first column of the second precoder P2, and the $W_m^{\{c2\}}(i)$ is a (i−1)th element of a second column of the second precoder P2, and the $W_m^{\{c3\}}(i)$ is a (i−1)th element of a third column of the second precoder P2, and d(0), d(1) and d(2) are data streams.

13. The method of claim 1, wherein when PMI-1 is an element of {k, n, i, j} and a rank is 4, the downlink data is represented as following equation, $$\begin{cases} X_0^k \cdot (W_m^{\{c1\}}(0)d(0) + W_m^{\{c2\}}(0)d(1) + W_m^{\{c3\}}(0)d(2) + W_m^{\{c4\}}(0)d(3)); & \text{for antenna group 0} \\ X_1^n \cdot (W_m^{\{c1\}}(1)d(0) + W_m^{\{c2\}}(1)d(1) + W_m^{\{c3\}}(1)d(2) + W_m^{\{c4\}}(0)d(3)); & \text{for antenna group 1} \\ X_2^i \cdot (W_m^{\{c1\}}(2)d(0) + W_m^{\{c2\}}(2)d(1) + W_m^{\{c3\}}(1)d(2) + W_m^{\{c4\}}(0)d(3)); & \text{for antenna group 2} \\ X_3^j \cdot (W_m^{\{c1\}}(3)d(0) + W_m^{\{c2\}}(3)d(1) + W_m^{\{c3\}}(1)d(2) + W_m^{\{c4\}}(0)d(3)); & \text{for antenna group 3,} \end{cases}$$

wherein the $X_x^{PMI-1}$ represents the first precoder P1 of xth antenna group for a given PMI-1, and the $W_m^{\{c1\}}(i)$ is a (i−1)th element of a first column of the second precoder P2, and the $W_m^{\{c2\}}(i)$ is a(i−1)th element of a second column of the second precoder P2, the $W_m^{\{c3\}}(i)$ is a (i−1)th element of a third column of the second precoder P2, and the $W_m^{\{c4\}}(i)$ is a (i−1)th element of a fourth column of the second precoder P2, and d(0), d(1), d(2), and d(03) are data streams.

14. A method for transmitting signals, performed in a base station, comprising:
    transmitting reference signals through directional beams formed by each of a plurality of antenna groups;
    receiving information on rank, a first precoder matrix index of a first precoder, and a second precoder matrix index of a second precoder for MIMO channels between the base station and a plurality of terminals which are determined based on the reference signals from the plurality of terminals; and
    determining MIMO transmission method for at least one of the plurality of terminals based on the information on rank, the first precoder matrix index, and the second precoder matrix index,
    wherein the first precoder is a precoding matrix for each of a plurality antenna groups to form directional beam, and the second precoder is a precoding matrix for achieving multiplexing gain using the directional beam,
    wherein the first precoder $P_1$ is determined according to the first precoder matrix index (PMI-1) received from the terminal as following equation, $$P_1 = \begin{cases} X_0^k; & \text{for antenna group 0} \\ X_1^n; & \text{for antenna group 1} \\ X_2^i; & \text{for antenna group 2} \\ X_3^j; & \text{for antenna group 3} \end{cases}$$

wherein $X_j^m$ means a mth fixed beam of lth antenna group, PMI-1 is an element of $\{k, n, i, j\}$.

15. The method of claim 14, wherein when the first precoder matrix indexes reported from at least two terminal are different or when the first precoder matrix indexes reported from at least two terminal are the same and the second precoder matrix indexes reported from at least two terminal are different, Multi User MIMO (MU-MIMO) is performed, or Single User MIMO (SU-MIMO) and MU-MIMO are performed simultaneously in order to transmit downlink data.

* * * * *